(12) United States Patent
Jiles et al.

(10) Patent No.: US 10,110,001 B2
(45) Date of Patent: *Oct. 23, 2018

(54) APPARATUS AND METHOD FOR ALTERING THE PROPERTIES OF MATERIALS BY PROCESSING THROUGH THE APPLICATION OF A MAGNETIC FIELD

(71) Applicant: DynaPulse, L.L.C., Minnetonka, MN (US)

(72) Inventors: David C. Jiles, Ames, IA (US); Steffen Magnell, Plymouth, MN (US); Mani Mina, Ames, IA (US)

(73) Assignee: DynaPulsa, L.L.C., Minnetonka, MN (US)

( * ) Notice: Subject to any disclaimer, the term of this patent is extended or adjusted under 35 U.S.C. 154(b) by 335 days.

This patent is subject to a terminal disclaimer.

(21) Appl. No.: 14/683,851

(22) Filed: Apr. 10, 2015

(65) Prior Publication Data

US 2015/0280433 A1    Oct. 1, 2015

Related U.S. Application Data

(63) Continuation of application No. 13/090,195, filed on Apr. 19, 2011, now Pat. No. 9,006,938.
(Continued)

(51) Int. Cl.
*H03K 3/00* (2006.01)
*H02J 3/00* (2006.01)
(Continued)

(52) U.S. Cl.
CPC ............... *H02J 3/00* (2013.01); *B01J 19/087* (2013.01); *H01F 7/202* (2013.01)

(58) Field of Classification Search
CPC ............ B01J 19/087; H01F 7/202; H02J 3/00
See application file for complete search history.

(56) References Cited

U.S. PATENT DOCUMENTS 2,118,008 A * 5/1938 Crapo ...................... H01B 5/02
148/337
3,063,832 A    11/1962 Snyder
(Continued)

FOREIGN PATENT DOCUMENTS

WO    2011133597    10/2011

OTHER PUBLICATIONS

Third Office Action for Chinese Patent Application No. 201180021759.2, dated Feb. 22, 2016 (6 pages) with English translation.
(Continued)

*Primary Examiner* — Jared Fureman
*Assistant Examiner* — Duc M Pham
(74) *Attorney, Agent, or Firm* — Pauly, DeVries Smith & Deffner LLC

(57) ABSTRACT

A system and method for altering the properties of a material by exposure of the material to a magnetic field is described herein. The method comprises generating a magnetic field; exposing a material to the magnetic field, and determining the optimum settings of the magnetic field parameters for the particular material. The magnetic field may be time varying or time invariant. Various properties of the magnetic field can be altered to determine the optimum settings for altering the material properties, including the amplitude, frequency, and waveform. In one embodiment, a method for improving the conductivity of a transmission line is provided, comprising: providing a high voltage electrical transmission line; temporarily installing a magnetic field generator along at least a portion of the transmission line; and generating a pulsed magnetic field around at least a portion of the transmission line using the magnetic field generator and simultaneously running a current through the transmission line.

20 Claims, 3 Drawing Sheets

Related U.S. Application Data

(60) Provisional application No. 61/325,558, filed on Apr. 19, 2010.

(51) Int. Cl.
  B01J 19/08 (2006.01)
  H01F 7/20 (2006.01)

(56) References Cited

U.S. PATENT DOCUMENTS

| | | | |
|---|---|---|---|
| 3,191,055 A | | 6/1965 | Swihart et al. |
| 4,539,992 A | * | 9/1985 | Calfee .................. A61N 1/3727 607/32 |
| 4,816,965 A | * | 3/1989 | Drits ....................... H01F 13/00 148/108 |
| 4,873,605 A | | 10/1989 | Drits et al. |
| 5,025,240 A | | 6/1991 | La Croix |
| 6,144,544 A | | 11/2000 | Milov et al. |
| 7,045,923 B2 | | 5/2006 | Fujii |
| 9,006,938 B2 | * | 4/2015 | Jiles ....................... B01J 19/087 307/106 |
| 2009/0308637 A1 | * | 12/2009 | Amils .................... H01B 5/104 174/130 |
| 2011/0267121 A1 | | 11/2011 | Jiles et al. |

OTHER PUBLICATIONS

First Office Action for Chinese Patent Application No. 201180021759.2, dated Jan. 7, 2015 (10 pages) including English translation.

Hadimani, R.L. et al., "Irrecoverable and Recoverable Resistivity in Gd5(SixGe1-x)4," IEEE Magnetic Letters, vol. 1, pp. 6000104 (2010) Feb. 24, 2010, 1-4.

Jiles, D. "Introduction to Magnetism and Magnetic Materials," Second Edition, Chapman and Hall, (1997), Fig. 12.9, p. 337.

Johnson, M.J. et al., "Studies on the effects of pulsed-magnetic field treatment on magnetic materials," Review of Progress in Quantitative NDE, Brunswick, Maine, Jul. 29-Aug. 3, 2001. RPQNDE 21, 1569, 2002, 1569-1576.

Lo, C.C.H. et al., "Evaluation of the effects of pulsed magnetic field treatment on magnetic materials," Materials Evaluation 60 (8), 971, 2002.

Lo, C.C.H. et al., "Improvement of magnetomechanical properties of cobalt ferrite by magnetic annealing," Presented at the International Magnetics Conference, Nagoya, Japan, Apr. 4-8, 2005. IEEE Transactions on Magnetics, 41, 3676, 2005 Oct. 2005, 3676-3678.

Non-Final Office Action for U.S. Appl. No. 13/090,195, dated Apr. 11, 2014 (19 pages).

Notice of Allowance for U.S. Appl. No. 13/090,195, dated Jan. 8, 2015 (7 pages).

PCT International Search Report and Written Opinion from International Application No. PCT/US2011/033118, dated Jun. 29, 2011, 13 pages.

Pecharsky, V.K. et al., "Giant Magnetocaloric Effect in Gd5(Si2Ge2)," Phys. Rev. Lett. 78, 4494, 1997 Jun. 9, 1997, 4494-4497.

Second Office Action for Chinese Patent Application No. 201180021759.2, dated Aug. 31, 2015 (7 pages) with English translation.

* cited by examiner

APPARATUS AND METHOD FOR ALTERING THE PROPERTIES OF MATERIALS BY PROCESSING THROUGH THE APPLICATION OF A MAGNETIC FIELD

This application is a continuation of U.S. application Ser. No. 13/090,195, filed Apr. 19, 2011, which claims the benefit of U.S. Provisional Application No. 61/325,558, filed Apr. 19, 2010, the contents of which are herein incorporated by reference.

FIELD OF THE INVENTION

This disclosure relates generally to conductive materials and, more particularly, to the exposure of materials to magnetic fields and related methods to alter their properties.

BACKGROUND

In recent years, the United States Energy Information Administration estimated that the average monthly American residential electricity consumption was 936 kilowatt-hours, with appliances accounting for the bulk of the electricity consumption. As people become more tied to their electronic devices, this number is likely to be on the rise. Consequently, power plants must work to meet the high demands of the population's energy consumption.

The United States operates approximately 157,000 miles of high voltage electric transmission lines, and though demand for electricity has increased, construction of transmission lines has actually decreased. As such, numerous problems have arisen. Electrical grids are congested, resulting in increased electricity costs. Additionally, line losses have also increased. According to the U.S. Department of Energy, transmission and distribution losses in the United States were up about 5% in 1970 and grew to 9.5% in 2001.

The significant transmission line loss in current methods of electrical power transmission results in substantial losses in energy and money. At present, it is estimated that up to 7.5% of the electricity transmitted is lost due to inefficiencies in the electrical grid, which is a loss of approximately $30 billion a year due to inefficiencies of the electrical grid. Thus, there remains a need in the art for improved power transmission materials and methods to substantially reduce the transmission line loss that would result in improved efficiencies, lower costs, and the preservation of viable resources.

SUMMARY OF THE INVENTION

The present invention is directed in part to a method for altering the properties of a material by exposure of the material to a magnetic field, the method comprising: generating a magnetic field; exposing a material to the magnetic field, and determining the optimum settings of the magnetic field for altering the properties of the material in a controlled way. In one embodiment of the invention, a coil is used to generate a magnetic field, and a pulse generator is used to generate a waveform.

The processing of materials to alter or improve their properties is well known. In the case of steels, processing using a combination of mechanical and thermal treatment has been known for thousands of years. These traditional treatments can lead to improvements in hardness, ductility/brittleness, toughness, and elastic modulus.

While the use of thermal and mechanical treatments is quite widespread, the use of other methods based on classical physical phenomena such as optical, acoustic, electric, magnetic and radiative treatments are less widely used. Ultrasound has been used in medical treatments of tissue, such as wound rehabilitation, and optical treatment, such as laser processing. It has also been used successfully to alter the permeability and power losses in electrical steels. Electrical processing is sometimes used as an alternative means of heat treatment through the electrical heating effect of a current. Radiation is known to affect material properties, usually adversely; particularly, it causes radiation hardening and embrittlement, which are both undesirable. Through exposure to a magnetic field, induction heating is often utilized for domestic uses and industrial purposes, such as induction hardening and induction soldering/brazing. Other uses of induction heating where extremely high temperatures are utilized have not been explored as thoroughly, however. The present invention is directed to the use of exposure to magnetic fields for the purpose of altering the properties of a material.

In the present invention, a material is exposed to a magnetic field in order to alter the properties of the material, and more specifically, to alter the conductive properties of the material. In one embodiment, the magnetic field may be time-varying. In another embodiment, the magnetic field may be time invariant. The magnetic field may be generated in any number of ways, including through the use of coils or other devices carrying an electric current or through the use of one or more permanent magnets. By exposing a material to a magnetic field, any number of the properties of the material may be altered, including, but not limited to, magnetization, mechanical hardness, thermal conductivity, elastic modulus, electrical resistivity, and magnetic permeability.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

FIGURES

The invention may be more completely understood in connection with the following drawings, in which.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed to a method for altering the properties of a material by exposure of the material to a magnetic field, comprising: generating a magnetic field; exposing a material to the magnetic field; and determining the optimum values for the amplitude and frequency of the magnetic field in order to alter properties of the material. The material may include metals, polymers, composites, and ceramics.

In an example implementation, the invention is directed to a method for improving the conductivity of a transmission line, comprising: providing a high voltage electrical transmission line; temporarily installing a magnetic field generator along at least a portion of the transmission line; and generating a pulsed magnetic field around the transmission line using the magnetic field generator and simultaneously running a current through the transmission line; wherein the conductivity of the transmission line is increased by at least 3 percent after treatment with the pulsed magnetic field and current.

In the present invention, a material is exposed to a magnetic field. In one embodiment, the magnetic field may be time-varying. In another embodiment, the magnetic field may be time invariant. The magnetic field may be generated in any number of ways, including through the use of coils or other devices carrying an electric current or through the use of one or more permanent magnets. By exposing a material to the magnetic field any number of the properties of the material may be altered, including, but not limited to, magnetization, mechanical hardness, thermal conductivity, elastic modulus, electrical resistivity, and magnetic permeability.

Figure 1:
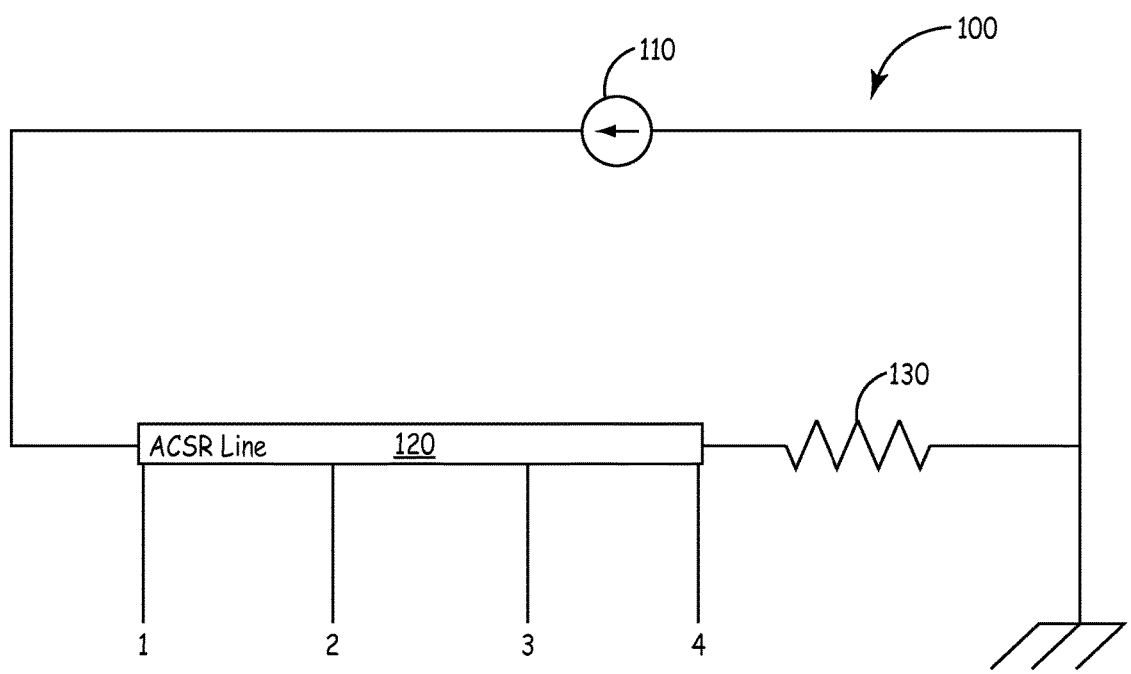
FIG. 1 is a circuit diagram illustrating one embodiment of a system used in the material treatment method of the present invention.
Figure 2:
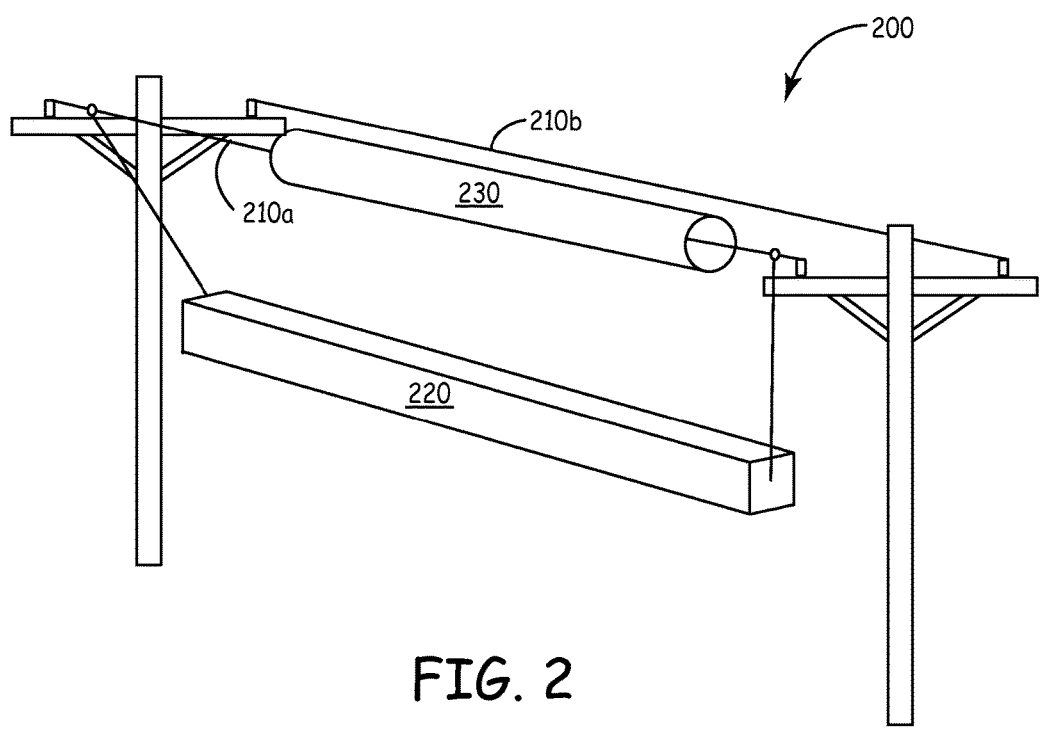
FIG. 2 is one embodiment of a system of the present invention used to treat transmission lines.

In one embodiment, the present invention is directed to a system for subjecting a material to a magnetic field for the purpose of altering the properties of the material, comprising: a coil configured to generate a magnetic field; a pulse generator configured to generate a waveform; and a power supply configured to generate a current in the coil. FIG. 1 shows an example circuit diagram for exposing a material to a magnetic field for the purpose of altering its properties with a DC power supply. In one embodiment of the system 200, the material is a transmission line or a power line 210a, 210b, as shown in FIG. 2. In the example shown in FIG. 2, two power lines 210a, 210b are shown, but only one power line 210a is being treated.

In the embodiment shown in FIG. 2, the circuitry 220 used for generating a current through the power line 210a is attached to the ends of the power line 210a to form a complete circuit. In one embodiment, the circuitry 220 includes a power supply and one or more resistors (not pictured), which are connected in series with the power line 210a. A magnetic field generator 230 is used to generate a magnetic field around the power line 210a. In a preferred embodiment, the magnetic field generator 230 produces a pulsed magnetic field.

In one embodiment, the magnetic field generator 230 may be an external wand for generating a magnetic field around the material to be treated. In another embodiment, the magnetic field generator 230 may be a cylindrical chamber that is open-ended on both sides, as in the example in FIG. 2, or be a chamber with a clam shell design. In yet another embodiment, the magnetic field generator 230 may be a coil wrapped around the material to be treated. The magnetic field generator 230 may comprise a power supply and a pulse generator to provide a pulsed magnetic field.

In one embodiment, the average strength of the magnetic field varies from 6 to 20 G. Where a magnetic field generator 230 is a coil, the average field strength may be approximately 6 G at the center of the coil and around 20 G around the edges of the coil. In another embodiments, the average magnetic field strength ranges from 6 to 40 G with a field strength of 6 G at the center of the coil and around 40 G around the edges of the coil. These ranges are also applicable where the magnetic field generator 230 is not coil.

The most significant observation from experimentation is the noted change in resistance of a material exhibited after the magnetic treatment of the present invention. This change in resistance of the length of cable results from a change in conductivity of the material.

Magnetic fields can have different effects on materials depending on the type of field exposure and on the type of material. Magnetic fields to which materials may be exposed may either be constant or pulsed. The field exposure may be from a direct current (DC) or alternating current (AC) source and may vary by amplitude, frequency, or waveform. AC magnetic fields are known to have many effects on materials, such as eddy currents and induction heating. Many of these effects are caused by eddy currents, which are formed when a conductor is exposed to a changing magnetic field. The material properties known to be affected by AC magnetic fields include penetration depth, induction (eddy current) heating in conducting materials, magnetic resonance in magnetic materials, power dissipation in conducting magnetic materials, possible reduction in defect density (e.g. dislocations), and Barkhausen emissions in magnetic materials that can also be used for non-destructive evaluation of stress and microstructure. In the case of a ferromagnetic conduction, pulse magnetic fields can lead to changes in the magnetic orientation of the spins of the unpaired electrons. A method employing such a pulsed magnetic field would therefore be spintronic because it involves both charge and spin conduction.

In an insulator, exposure to a pulsed magnetic field can result in perturbation of bound electron motion. In ferromagnetic insulator materials, exposure to a pulsed magnetic field can affect spin conduction, which can lead to spintronic effects and magnetostriction, among other effects. This can result in stress relief as a result of cycling the magnetic field.

DC fields are also known to affect material properties. For magnetic materials, the effect of the magnetic field on spins and hence magnetization can have an effect on other properties such as strain. Whether the magnetic materials are conducting or insulating materials will have little additional consequence. If the material is non-magnetic, then the only effect that the field will have is to alter charge conduction in the material due to the Hall Effect. This according to present understanding is a reversible effect. Other effects caused by DC fields include magnetization changes in magnetic materials, magnetostriction (change in length) in magnetic materials, magnetocaloric effect, Barkhausen effect emissions that can be used for non-destructive evaluation (NDE) of stress and microstructure, and magnetoacoustic emission. These can all lead to irreversible changes, as discussed in R. L. Hadimani and D. C. Jiles, "Irrecoverable and Recoverable Resistivity in Gd5(SixGe1-x)4", IEEE Magnetic Letters, Vol. 1, pp. 6000104 (2010), which is incorporated herein by reference. Changes in materials properties such as conductivity are affected by dislocation density.

As such, optimum settings of a magnetic field must be determined for a given material. Significantly, the optimum settings of a magnetic field for one material may not be the same for a different material. Thus, various settings must be tested for particular materials. The settings include such values as amplitude, frequency, and waveform.

The field may oscillate with various waveforms, including sinusoidal wave, square wave, or triangle wave. The type of material may be magnetic/conducting, magnetic/non-conducting, non-magnetic/conducting, or non-magnetic/non-conducting. Broadly speaking, the effects are largest for magnetic/conducting material and are progressively smaller for the other materials, with non-magnetic/non-conducting exhibiting the smallest effect.

These effects are classified herein as irreversible and reversible. Irreversible effects cause changes in measurable properties of a material, such as dislocation density, magnetic permeability, and electrical conductivity that do not revert when the field is removed. Reversible effects cause a change in a measurable property but then revert to their original values when the field is removed.

A DC field affects magnetic material largely through the change in magnetization and the associated magnetostriction. The change in magnetization can cause the sample to heat up due to the reduction in entropy caused by application of the field, but in most materials this effect is quite small, although it can be significant in some materials, as discussed in V. K. Pecharsky and K. A. Gschneidner Jr., Phys. Rev. Lett. 78, 4494, 1997, which is incorporated herein by reference. When applied to a conducting material, an AC field causes eddy currents and the screening of the incident field in the material, which limits its depth of penetration. However, there is associated eddy current heating when an AC field is applied, which can have the effect of relieving residual stress and in some cases even causes phase changes in the material. In the case of a material that is both magnetic and conducting, these effects are large. When an AC field is applied to non-conducting magnetic materials, these eddy currents do not occur, so in these cases the effect is limited to changes in magnetization and other purely "magnetic" effects, such as magnetic resonance and magnetostriction. Finally, in a nonmagnetic, non-conducting material, the effects are quite limited as there are no magnetic effects and no eddy currents. This means that the effects are very small compared with what occurs in the other types of materials.

There have been occasional references to the use of magnetic processing. For example, the work of Lo et al. discusses exposing steels to time dependent magnetic fields (see M. J. Johnson, C. C. H. Lo, J. E. Snyder, J. Leib, S. J. Lee, M. Mina and D. C. Jiles. "Studies on the effects of pulsed-magnetic field treatment on magnetic materials," Review of Progress in Quantitative NDE, Brunswick, Me., Jul. 29-Aug. 3, 2001. RPQNDE 21, 1569, 2002; C. C. H. Lo, D. C. Jiles, M. Mina, M. J. Johnson, L. C. Kerdus and J. Leib. "Evaluation of the effects of pulsed magnetic field treatment on magnetic materials", Materials Evaluation 60 (8), 971, 2002; D. C. Jiles, M. J. Johnson, C. C. H. Lo, and S. J. Lee, "Magnetic processing for enhancement of lifetimes of ferrous metals subjected to repeated stress," National Science Foundation, Grant Number CMS-9910147, October 2002, all of which are incorporated herein by reference) and also shows that exposure of certain types of magnetic ferrites to a combination of magnetic field and heat (the so-called "magnetic anneal") can be used to improve the magnetic anisotropy (see C. C. H. Lo, A. P. Ring, J. E. Snyder and D. C. Jiles. "Improvement of magnetomechanical properties of cobalt ferrite by magnetic annealing," Presented at the International Magnetics Conference, Nagoya, Japan, Apr. 4-8, 2005. IEEE Transactions on Magnetics, 41, 3676, 2005, which is incorporated herein by reference). Earlier work has verified, for example, that the permeability of soft magnetic materials such as Permalloy (a nickel iron magnetic alloy) can be altered by a combination of thermal annealing and magnetic field (see D. Jiles, "Introduction to Magnetism and Magnetic Materials," Second Edition, Chapman and Hall, (1997), FIG. 12.9, p. 337, which is incorporated herein by reference) and that certain types of permanent magnetic materials can have their properties improved (coercivity, anisotropy/texture) if they are fabricated in the presence of an applied magnetic field.

The exposure of magnetic materials to magnetic fields results in changes in the magnetization (or magnetic flux density) and usually magnetostriction. In the case of exposure to magnetic fields, there is evidence that other changes in mechanical and other properties can be achieved, as discussed in R. F. Hochman, V. Drits and N. Tselesin, "Magnetic fields: Fertile ground for Metals Processing," Advanced Materials & Processes, 154, 230, 1988, which is incorporated herein by reference. All of these changes relate to the presence of defects (such as dislocations or other imperfections) inside the material, and these defects can be altered by the exposure to magnetic fields, as discussed in R. F. Hochman, V. Drits and N. Tselesin, "Surface Modification by Magnetic Treatment," Encyclopedia of Materials Science and Engineering, p. 2037, R. W. Cahn (Editor), Pergamon Press, 1994, which is incorporated herein by reference.

The exposure of different materials to magnetic fields can have quite different effects, so it is difficult to separate out these effects. Reports in the literature can be quite confused and seemingly contradictory because what works in one material does not necessarily work in another.

For example, in electrically conducting materials, the exposure to a time-varying magnetic field induces eddy currents in the material, resulting in heating of the material. This is the so-called induction heating that is widely used in the processing of materials, such as, for example, in the production of high quality single crystals. However, the same procedure applied to an insulating material would not cause induction heating and therefore may have little overall effect of the material.

On the other hand, the application of a time dependent magnetic field to a magnetic material (whether conducting or insulating) causes a change in magnetization and usually an accompanying magnetostriction. If the material is exposed to the time-varying field over a long period of time (thousands of cycles), the magnetostriction can cause a reduction in dislocation density, which reduces residual stress and increases conductivity. Furthermore, if the magnetic material is also electrically conducting, then the application of the time-varying magnetic field will also cause induction heating, which reduces the dislocation density.

The exposure of materials to a high but time-independent magnetic field changes magnetization and magnetostriction but does not cause induction heating even if the material is electrically conducting.

In the case of some highly magnetostrictive materials, the application of a DC magnetic field causes so much strain that the dislocation density is increased and the resistivity rises as a result of increased scattering of electrons on the material. This increase in resistivity can be removed and the original resistivity recovered by exposure to elevated temperatures over a period of time.

In the case of some of the recently discovered thin film magnetoresisitive materials, the application of a DC magnetic field can increase the resistance ΔR/R by as much as 100% or reduce the resistance by as much as 80%. In these cases, the electrical performance of circuits containing these devices, usually sensor circuits, is radically changed by the application of a magnetic field. In this application, the effect is reversible so that permanent alterations in the structure of the material do not take place, as was the case in the reduction of dislocation density.

In one embodiment, rather than exposing the material to a magnetic field in order to induce an eddy current, a current is directly passed through the material, thereby producing a magnetic field.

Testing Procedure

A series of tests were conducted at Iowa State University in Ames, Iowa. Aluminum conductor steel reinforced (ACSR) power lines were treated with the magnetic treatment disclosed herein and showed an increase in conductance. The measurements taken during testing were videotaped in order to reduce any propensity for subjectivity or error. The voltage and current measurements were recorded from the video record afterwards. The testing procedure included the following steps:

1. Prepare the test equipment following the setup describe above (see FIG. 1).
2. Turn power supply on for one minute; ensure a current drop of 1 A for a warm-up.
3. Begin taking period measurements.
   a. Turn on power supply and being videotaping.
   b. Confirm 1 A is being drawn.
   c. Run 1 A through the power line for one minute.
   d. Turn off power supply and stop videotaping.
   e. Allow power line to cool down for two minutes.
   f. Repeat, starting at step a.
4. Review recorded video and record data.

The system for subjecting a material to a magnetic field for the purpose of altering the properties of the material comprised: a coil configured to generate a magnetic field; a pulse generator configured to generate a waveform; and a power supply configured to generate a current in the coil. FIG. 1 shows an example circuit diagram 100 for exposing a material to a magnetic field for the purpose of altering its properties with a DC power supply. In the configuration in FIG. 1, a DC current source 110 provides approximately 1 amp of current through an untreated ACSR transmission line 120 in series with a 2 Ω, 5 W resistor 130. The charged particles of the current generate a magnetic field. The current passing through the ACSR line 120 causes a voltage drop across the ACSR line 120. Approximately 2.2 V are applied across the ACSR-2 Ohm resistor load 120, 130, resulting in voltage drops across both elements. The voltage drop is measured across the ACSR line 120 only.

In one embodiment, the DC power supply 110 is a Hewlett Packard E3631A, and a Hewlett Packard 3478A multimeter is used for taking measurements. One having ordinary skill in the art will recognize that other power supplies and multimeters can be used without departing from the spirit and scope of the present invention.

It should be noted that the values calculated during experimentation are not exact, as different aspects of the system may affect the values. These factors that affect the accuracy of the calculated resistance includes parasitic introduced from the cable connectors, the parasitic from the measurement wires themselves, errors in the output current readings, and errors in the multimeter readings. The most significant observation is the noted change in resistance of the material seen after the magnetic treatment of the present invention. This change in resistance results from a change in conductivity of the material.

Figure 3:
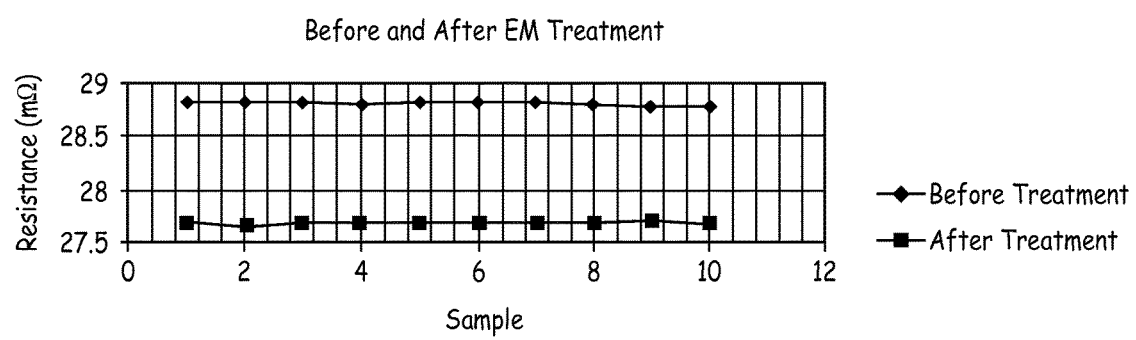
FIG. 3 is a graph showing the change in resistance of a material before and after the magnetic treatment of the present invention.
Figure 4:
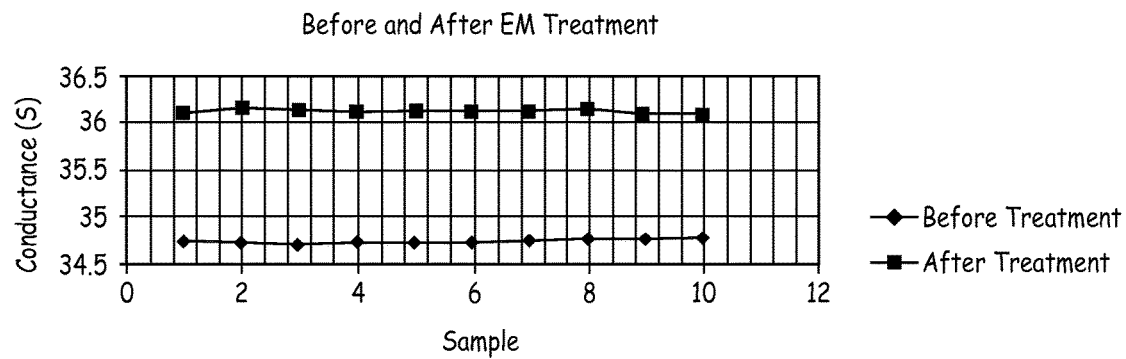
FIG. 4 is a graph showing the change in conductance of a material before and after the magnetic treatment of the present invention.

Measurements to determine the resistance and conductance of the materials were taken before and after magnetic treatment, as shown in FIGS. 3 and 4. As shown in FIG. 4, the conductance of the material prior to the magnetic treatment was 34.714 Siemens, while the conductance of the material increased to 36.108 Siemens after magnetic treatment. This yielded a 3.9369% increase in conductance, as shown below:

Percent Difference: % Diff =

$$\frac{|x_1 - x_2|}{\left(\frac{x_1 + x_2}{2}\right)} \times 100\% = \frac{|34.714 - 36.108|}{\left(\frac{114.714 + 36.108}{2}\right)} \times 100\% = 3.9369\%$$

Experimental Results

Figure 5:
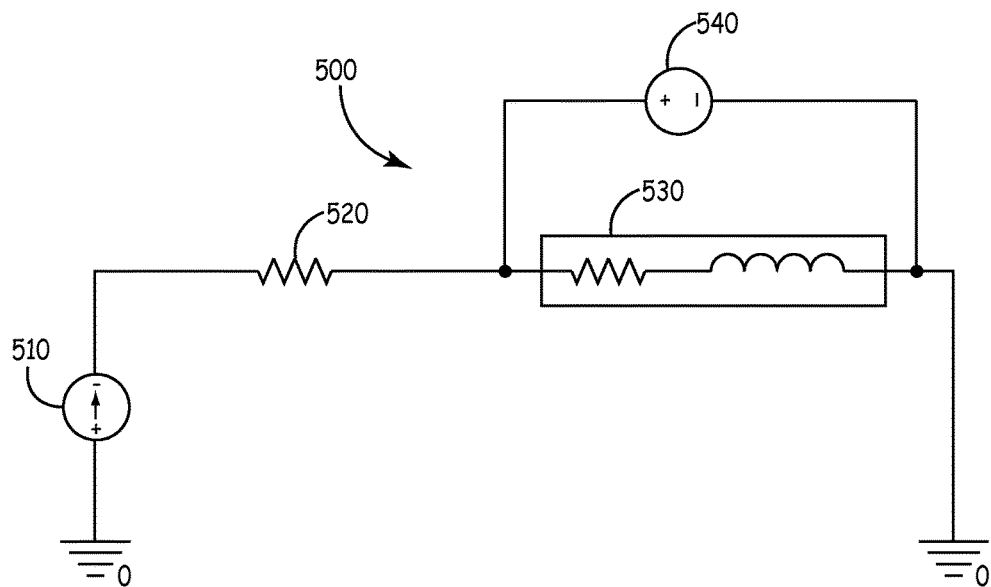
FIG. 5 is a circuit diagram illustration an alternative embodiment of a system used in the material treatment method of the present invention.

FIG. 5 shows the circuit 500 test setup in one embodiment of the invention. In that arrangement, 0.15 Ω, 50 W resistor 520 is placed in series with an ACSR transmission line 530. A multimeter 540 is used to record the voltage across the transmission line 530. The circuit is first current limited to 4.5 A using a DC current source 510. The voltage is then ramped to the maximum value that achieves a 4.5 A current draw. After waiting about five minutes, the circuit 500 is in a steady state. At that point, the resistor 520 is warm, so a fan (not shown) is used to cool it. The multimeter 540 is then used to record the voltage across the transmission line 530.

The voltage, current, resistance, and conductivity of the transmission line 530 before and after the line is treated with the current supply is shown in the tables below:

| $V_{line}$ | $I_{line}$ | $R_{line}$ | $\sigma_{line}$ |
|---|---|---|---|
| BEFORE TREATMENT | | | |
| 5.6 mV | 4.5 A | 1.244 mΩ | 803.86 S |
| AFTER TREATMENT (DIRECTLY AFTER) | | | |
| 6.4 mV | 4.5 A | 1.422 mΩ | 703.125 S |

Resistance and conductivity of the transmission line 530 were calculated as follows:

$$R_{line} = V_{line}/I_{line}(\Omega) \sigma_{line} = 1/R_{line}(S)$$

The results showed an increase in resistance and decrease in conductivity after the treatment, where the "after treatment" values were calculated directly after treatment of the circuit. However, when measurements were taken after more time passed after treatment, the results were different. The may be due to the fact that residual heat generated by eddy currents in both the transmission line 530 and the resistor mount 520 cause issues when measuring conductivity. It should be stressed, however, that the heat generated by eddy currents is mostly negligible and due to the fact that no circuit is 100% efficient. As such, in one embodiment, the temperature increase in the circuit is no more than 10° F. In another embodiment, the temperature increase in the circuit is no more than 5 F. The table below shows the results when measurements were taken approximately ten minutes after treatment of the transmission line 430:

| 10 MIN POST-TREATMENT MEASUREMENT | | | |
| --- | --- | --- | --- |
| $V_{line}$ | $I_{line}$ | $R_{line}$ | $\sigma_{line}$ |
| 5.33 mV | 4.511 A | 1.182 mΩ | 846.341 S |

The results showed that waiting at least ten minutes post-treatment of the transmission line 430 allows for more valid measurements showing the effects of the treatment. In this example, the conductivity of the transmission line 530 was shown to increase:

$$\left| \frac{846.34 - 803.86}{846.34} \right| \times 100\% \approx \boxed{5\%}.$$

The strong magnetic pulsing of the treatment resulted in an increase in the conductivity of the ACSR transmission line 530 of 5%.

It will be appreciated that, although the implementation of the invention described above is directed to the treatment of aluminum and aluminum alloys, the present device may be used on other materials and is not limited to aluminum and aluminum alloys. Embodiments of this invention would also be suitable for treating other metals and materials. The material may include metals, polymers, composites, ceramics, and any other materials with conductive properties. In addition, while the present invention has been described with reference to several particular implementations, one having ordinary skill in the art will recognize that many changes may be made hereto without departing from the spirit and scope of the present invention.

The invention claimed is:

1. A method for altering the resistive properties of a substantially continuous conductive material, comprising:
   providing a current through the conductive material for a period of time;
   providing a magnetic field generator; and
   generating a pulsed magnetic field with the magnetic field generator surrounding the substantially continuous conductive material;
   wherein the generated pulsed magnetic field has an average field strength ranging from 6 to 40 G, and wherein the distance between the substantially continuous conductive material and the magnetic field generator is substantially constant,
   such that the substantially continuous conductive material shows an increase in conductivity of before and after altering the resistive properties.

2. The method of claim 1, wherein the generated magnetic field has an average field strength ranging from 6 to 20 G.

3. The method of claim 1, wherein the magnetic field generator provided comprises a coil, a pulse generator, and a power supply.

4. A method for improving the conductivity of a transmission line, comprising:
   generating a pulsed magnetic field around a non-ferromagnetic transmission line while the distance between the transmission line and the magnetic field generator is substantially constant; and
   simultaneously running a current through the transmission line for a period of time.

5. The method of claim 4, wherein the period of time is approximately five minutes.

6. The method of claim 4, wherein the pulsed magnetic field is generated using a coil and pulse generator.

7. The method of claim 6, wherein the generated pulsed magnetic field has an average field strength ranging from 6 to 40 G within the coil.

8. The method of claim 6, wherein the generated pulsed magnetic field has an average field strange ranging from 6 to 20 G within the coil.

9. The method of claim 4, wherein the pulsed magnetic field is generated using a wand.

10. The method of claim 4, wherein the pulsed magnetic field is generated using a chamber surrounding the length of the transmission line.

11. The method of claim 4, wherein current running through the transmission line is approximately 4 to 5 Amps.

12. The method of claim 4, wherein the period of time is adequate to allow the circuit to reach steady state.

13. A system for improving the conductivity of a material, comprising:
   a non-ferromagnetic conductive material;
   a magnetic field generator configured to generate a magnetic field around the non-ferromagnetic conductive material without substantially varying the distance between the magnetic field generator and the conductive material; and
   at least one of a current or voltage source.

14. The system of claim 13, wherein the conductive material comprises a transmission line.

15. The system of claim 14, wherein the magnetic field generator produces a pulsed magnetic field.

16. The system of claim 15, wherein the magnetic field generator comprises a coil, a pulse generator, and a power supply.

17. The system of claim 14, wherein the magnetic field generator comprises an external wand.

18. The system of claim 14, wherein the magnetic field generator comprises a chamber, wherein the chamber consists of one of a cylindrical or clam shell form factor.

19. The system of claim 14, wherein the transmission is an aluminum conductor steel reinforced (ACSR) power line.

20. The system of claim 14, further comprising a resistor, wherein the resistor is in series with the conductive material, and the current or voltage source.

* * * * *